United States Patent [19]
Ladell

[11] 3,811,865
[45] May 21, 1974

[54] METHOD OF FORMING IRON ORE PELLETS USING A FINELY DIVIDED TREE BARK BINDER

[75] Inventor: John L. Ladell, Port Credit, Ontario, Canada

[73] Assignee: Ontario Research Foundation, Ontario, Canada

[22] Filed: May 30, 1972

[21] Appl. No.: 258,043

[52] U.S. Cl. .................................................. 75/3
[51] Int. Cl. ........ C21b 1/26, C21b 1/08, C22b 1/14
[58] Field of Search ............................. 75/3; 162/93

[56] References Cited
UNITED STATES PATENTS
841,718    1/1907   Robeson ................................. 75/3
2,394,793  2/1946   Maier ...................................... 75/3
2,668,105  2/1954   de Jahn ................................... 75/3
2,865,731  12/1958  Crowe ..................................... 75/3
3,245,869  4/1966   Gregory et al. ....................... 162/93

OTHER PUBLICATIONS

Clermont, L. P. et al., "Studies on Composition of Bark; Utilization for Structural Boards," Paper Trade Journal 5/6/48.

Primary Examiner—A. B. Curtis
Assistant Examiner—Mark Bell

[57] ABSTRACT

Tree bark is used as a binder in pelletizing iron ore concentrates prior to furnace reduction operations.

8 Claims, No Drawings

METHOD OF FORMING IRON ORE PELLETS USING A FINELY DIVIDED TREE BARK BINDER

This invention relates to the production of iron, more particularly to the formation of feed material for a blast furnace.

It is known to form iron ore feed for a blast furnace into pellets containing iron-ore concentrate, in order to increase the efficiency of the process before and during firing.

The pellets commonly are formed by mixing finely ground ore concentrates with a binder. The mixture then is formed into pellets which are fired at high temperatures to harden them. The pellets so produced are rendered sufficiently strong to withstand handling, shipping and other operations prior to use as feed to the furnace, as well as the pressure that develops in the furnace during the steelmaking process.

A number of binders have been used but the most commonly employed is bentonite clay. Current production of iron-ore pellets in Eastern Canada is of the order of 25 million tons and is expected to reach 75 million tons in 1975, with binder requirements reaching about 300,000 tons by that time. A number of suggestions have been made of substitutes for bentonite, as such substitutes have included waste sulphite liquors, cereal binders, resins and cements. However, none of these substitutes has been found entirely commercially satisfactory.

It has now been found in accordance with this invention that finely divided tree bark may be used as binder material.

Tree bark is a waste material of the pulp, paper and allied timber industries which at the present time is readily available and indeed represents a considerable disposal problem. Thus, from spruce, which is the prime pulpwood in Ontario, Canada, representing about 60 percent of the volume of all softwoods and about 50% of all wood species, about 360,000 tons of bark residue are produced each year. Other species, such as pine and some of the commercially important hardwoods have a considerably higher bark content per tree than that of spruce.

Several uses have been suggested for tree bark to alleviate this problem such as an industrial fuel, as a horticultural mulch and soil conditioner, and as a raw material for carbonization processes. These uses generally have been unsatisfactory in disposing of large quantities of bark, and in Ontario the only significant use of the bark is as a fuel to fire steam generating plants on the pulp mill site.

The use of bark as a replacement for even a small part of the bentonite clay utilization clearly will result in the consumption of considerable quantities of this material, and hence the disposal problem may be substantially reduced.

The bark employed as binder for the ore concentrate in accordance with the present invention is in a finely divided form and produces results in pelletizing comparable to those of bentonite clay. The bark may be reduced to powder by grinding or may be shredded in a disc refiner, to provide the finely divided form, and such operations may be carried out on dry or wet bark.

It has been found that the binding capacity of shredded bark depends to a certain extent on the degree of fineness to which it is reduced. Typically, particle sizes of bark of −40 mesh, preferably −100 mesh, may be employed to provide satisfactory pellets.

In the grinding of the bark to the required particle size there are a number of parameters which vary widely. These parameters include the species and source of the bark, the moisture content of the bark, the form of bark before reduction and any treatments to the bark before grinding. For a particular binding operation, the parameters are chosen to provide a satisfactory product.

Since it is beneficial from a cost point of view to utilize bark from a pulp mill located in the vicinity of a pelletizing operation and hence in the vicinity of a source of iron ore, the choice of type of bark and the moisture content and form of bark may be decided by the wood utilized in the mill. Utilization of the bark in such adjacent locations renders it unnecessary to transport bentonite from a remote location.

The bark may be subjected to a plurality of pretreatments, depending on the nature of the bark chosen and the degree of binding required. These procedures may include organic solvent extraction to remove resins and other organic solvent-soluble materials. Further, treatment with alkali, such as sodium hydroxide solution may be used. The latter treatment, which increases the gel strength of the bark, provides a product with superior properties, especially with coarser ground bark, as compared to the same grind of bark without such treatment.

The finely divided bark is mixed with iron ore concentrate and the mixture is formed into pellets which are fired at an elevated temperature. Prior to mixing with the iron ore concentrate, the bark may have been subjected to one of the above treatments.

The form of the pellets and their properties depend on a number of factors, such as, the form of bark, the particle size employed, the loading rate, the moisture content and the addition of other materials. Pellets formed in this manner have been found to have satisfactory handling properties which in some cases are superior to pellets prepared from bentonite.

The invention is illustrated by the following Examples:

EXAMPLE I

Pellets of iron ore concentrate and wood bark as binder were prepared and tested and the results compared to those for pellets formed using bentonite as binder. The iron ore concentrate in each case was magnetic having a surface area of about 1,450 cm$^2$/gram.

Several different forms of bark were tested, namely:

1. Powdered black spruce bark of −100 mesh.
2. Powdered black spruce bark of −40+60 mesh.
3. Coarse shredded (disc refined) black spruce bark.
4. Finely shredded (disc refined) black spruce bark.

These materials were tested in an untreated form and also in a form in which the bark initially was treated with sodium hydroxide solution at a rate of 2 lbs. NaOH per ton of ore. Some of the treated samples were contacted by the sodium hydroxide solution over a 24-hour period at room temperature while others of the treated samples were contacted by the sodium hydroxide solution for 2 hours at about 90° C. The samples were used to form pellets from the iron ore concentrate and tests were carried out for wet and dry pellet strengths.

The pellets were formed in the following manner: 1,000 grams of dry ore was mixed with 110 mls of water in a 5 gallon mixing drum. The binder was added to the wet mixture and mixed for a few minutes. The mixture then was passed through a shredder to obtain a pelletizing feed of approximately 10 mesh size.

A small amount of this feed was pelletized in a 16 × 8 inch tire rotating at 52 RPM to obtain seed pellets of +8−4 mesh size. Excess seed pellets were shredded. The seed pellets then were built up with feed material to +7/16 inch −½ inch size in as short a time as possible. Any additional moisture required was added as a fine spray. After the desired pellet size was achieved, they were allowed to roll for one more minute and then were removed from the drum for testing and drying.

The green pellets so formed were subjected to drop and compression tests. In the drop test, the pellet was dropped from a height of 12 inches onto a steel plate. The number of drops a pellet survives were noted. In each case 10 pellets were tested. The load that was required to break a pellet was determined using a manual compression tester with a screw-type load applicator.

The remaining pellets from the batch were dried at a temperature of about 95° C after weighing for moisture content determination. The dried pellets were compression tested in the same manner as the wet pellets.

The results are reproduced in the following Table I.

EXAMPLE II

Pellets of iron ore concentrate and wood bark as binder were prepared as in Example I from a magnetite concentrate having a surface area of about 1,920 $cm^2$/gram.

The different forms of bark tested are as follows:
1. Powdered black spruce bark of −100 mesh untreated.
2. Powdered black spruce bark of 1 extracted with a mixture of alcohol and benzene.
3. Powdered balsam fir bark of −100 mesh untreated.
4. Powdered balsam fir bark of 3 extracted with a mixture of alcohol and benzene.

A number of differing forms of the bark were used, with differing quantities of binder. Some samples of binder were treated prior to pelletizing by the following procedures:
a. the bark was soaked in water for 24 hours prior to the pelletizing;
b. the bark was treated with an aqueous sodium hydroxide solution at a rate of 2 lbs NaOH/ton of ore and the bark was allowed to soak in the sodium hydroxide solution for 24 hours prior to the pelletizing;
c. the bark was treated with an aqueous sodium hydroxide solution at a rate of 2 lbs NaOH/ton of ore, the bark was oven-dried at a temperature of about 80°–90° C and then reground, before being utilized in the pelletizing procedure;
d. 10 lbs/ton of ore of powdered limestone was added to the binder during pellet formation.

The samples were used to form pellets with the iron concentrate and the pellets were subjected to testing procedures and compared to pellets formed using bentonite. The manner of formation of the pellets and the testing procedures were as described above with reference to Example I.

The following Table II reproduces the results.

TABLE I

| Test No. | Binder | Quantity | Pretreatment | % Moisture | 12" Drops (Average of 10) Wet | Compression Strength lbs. (Average of 10) Wet | Dry |
|---|---|---|---|---|---|---|---|
| 1 | 1 | 16 lbs./ton | None | 10.2 | 11.8 | 1.6 | 3.5 |
| 2 | 1 | 16 lbs./ton 2 lbs./ton NaOH | 2 hrs. 90°C | 9.1 | 7.5 | 3.3 | 15.8 |
| 3 | 2 | do. | do. | 9.3 | 7.0 | 2.9 | 10.4 |
| 4 | 4 | do. | do. | 8.9 | 3.0 | 2.2 | 13.4 |
| 5 | 1 | do. | 24 hrs. RT | 9.4 | 8.0 | 3.2 | 14.6 |
| 6 | 2 | do. | do. | 9.2 | 7.0 | 2.8 | 10.2 |
| 7 | 4 | do. | do. | 9.3 | 3.0 | 2.8 | 12.9 |
| 8 | Bentonite | 16 lbs./ton | None | 9.2 | 11.0 | 2.9 | 7.3 |
| 9 | do. | do. | do. | 9.3 | 11.3 | 2.9 | 7.7 |

TABLE II

| Test No. | Binder | Quantity (lbs./ton) | Additional Treatment | % Moisture | 12" Drops (Average of 10) Wet | Compression Strength lbs. (Average of 10) Wet | Dry |
|---|---|---|---|---|---|---|---|
| 1 | 1 | 12 | None | 8.6 | 5.5 | 2.0 | 2.3 |
| 2 | 1 | 16 | None | 9.2 | 6.2 | 1.9 | 2.2 |
| 3 | 1 | 20 | None | 7.2 | 5.1 | 2.0 | 2.2 |
| 4 | 1 | 16 | 2 lbs./ton NaOH held for 24 hours at RT | 9.5 | 10.1 | 2.7 | 7.2 |
| 5 | 1 | 16 | 2 lbs./ton NaOH mixed with binder then oven-dried and reground | 10.0 | 8.9 | 2.1 | 8.9 |
| 6 | 1 | 16 | soaked for 24 hrs. | 8.9 | 6.3 | 2.1 | 2.7 |
| 7a | 2 | 16 | soaked for 24 hrs. | 9.0 | 5.8 | 2.5 | 3.4 |
| 7b | 2 | 16 | soaked for 24 hrs. | 8.9 | 6.3 | 2.1 | 2.7 |
| 8 | 2 | 16 | 2 lbs./ton NaOH held for 24 hrs. at RT | 9.2 | 8.2 | 2.8 | 10.5 |
| 9 | 2 | 16 | None | 8.9 | 6.0 | 2.3 | 2.5 |
| 10 | 3 | 16 | None | 9.5 | 10.1 | 2.1 | 4.5 |
| 11 | 3 | 16 | soaked for 24 hrs. | 9.5 | 9.1 | 2.4 | 6.2 |

TABLE II—Continued

| Test No. | Binder | Quantity (lbs./ton) | Additional Treatment | % Moisture | 12" Drops (Average of 10) Wet | Compression Strength lbs. (Average of 10) Wet | Dry |
|---|---|---|---|---|---|---|---|
| 12 | 3 | 16 | 2 lbs./ton NaOH held 24 hrs. at RT | 9.7 | 7.7 | 1.4 | 10.9 |
| 13 | 4 | 12 | None | 9.4 | 6.7 | 2.2 | 2.9 |
| 14 | 4 | 16 | None | 10.6 | 9.6 | 2.2 | 3.2 |
| 15 | 4 | 20 | None | 10.9 | 13.3 | 2.4 | 4.1 |
| 16 | 4 | 16 | soaked for 24 hrs. | 10.6 | 21.8 | 2.8 | 4.7 |
| 17 | 4 | 20 | soaked for 24 hrs. | 11.2 | 20.2 | 2.8 | 6.1 |
| 18 | 4 | 16 | 2 lbs./ton NaOH held for 24 hrs. at RT | 10.4 | 25.8 | 2.8 | 9.5 |
| 19a | 4 | 16 | 2 lbs./ton NaOH mixed with binder, oven-dried and reground | 9.5 | 9.1 | 2.7 | 11.2 |
| 19b | 4 | 16 | do. | 10.8 | 14.5 | 2.6 | 14.1 |
| 20 | 4 | 16 | soaked for 24 hrs. 10 lbs./ton limestone added | 9.9 | 11.8 | 2.5 | 4.1 |
| 21 | 4 | 16 | 2 lbs./ton NaOH held for 24 hrs. at RT — 10 lbs./ton limestone added | 10.0 | 22.3 | 2.9 | 9.7 |
| 22 | Bentonite (mean results) | 16 | None | 9.3 | 16.5 | 2.3 | 14.3 |

The results of the above examples indicate that it is possible to provide pelletized iron concentrate using tree bark as a binder, the pellets having in many cases comparable properties to bentonite-bound concentrates.

EXAMPLE III

Pellets were made using the procedure of Example I from balsam fir bark as binder for the magnetitic concentrate of Example II. In the first batch, 2 lbs of sodium hydroxide per ton of ore as aqueous solution were added to the ore and the mixture held for 24 hours prior to pelletizing. In a second batch, additionally, 10 lbs of limestone per ton of ore was added to the binder during the pelletizing process.

The pellets were fired in a basket of expanded metal in a gas fired furnace at 2,300° F for a period of 1 hour. During heat up and during the firing a stream of air was passed through the pellets at a rate of 0.5 cubic ft/min per lb of pellets. After firing the pellets were allowed to cool down were subjected to compression strength tests and to the Dravo tumble test.

In the latter test, a test of resistance to abrasion, 500 grams of fired pellets were placed in a 3 foot × 0.5 foot steel tube which was capped at both ends and the tube was rotated about its axis seven times. The charge then was screened at 28 mesh and the percentage of fires produced is the Dravo Tumble Index.

The first batch of pellets had compression test value (average of 20 pellets) of 660 lbs and a Dravo Index of 0.51 percent while the second batch of pellets had a compression test value (average of 20 pellets) of 618 lbs and a Dravo Index of 0.45 percent. These values are favourable comparable to results obtained with fired pellets using bentonite as binder.

Many modifications are possible within the scope of the invention.

What I claim is:

1. A method of forming iron ore pellets which comprises mixing a finely ground iron ore concentrate with a binder, said binder consisting of finely divided tree bark having an average particle size −40 mesh, and pelletizing said mixture.

2. In the production of iron by reducing an iron oxide-containing ore, the improvement which comprises mixing finely ground iron ore concentrate with a binder, said binder consisting of finely divided tree bark having an average particle size −40 mesh pelletizing said mixture, and reducing the iron oxide in the pellets so formed.

3. The process of claim 2 wherein said tree bark is black spruce bark.

4. The process of claim 2 wherein said tree bark is balsam fir bark.

5. The process of claim 2 wherein said bark is powdered and has an average particle size of −100 mesh.

6. The process of claim 2 wherein said bark is shredded.

7. The process of claim 2 wherein said bark is subjected to treatment with aqueous-sodium hydroxide solution prior to mixing with said iron ore concentrate to increase the gel strength of said bark.

8. The process of claim 2 wherein said bark is subjected to extraction by organic solvents to remove resins from said bark prior to mixing with said iron ore concentrate.

* * * * *